(12) United States Patent
Scott et al.

(10) Patent No.: US 11,258,991 B2
(45) Date of Patent: Feb. 22, 2022

(54) VIDEO PROCESSING REQUEST SYSTEM FOR CONVERTING SYNCHRONOUS VIDEO PROCESSING TASK REQUESTS TO ASYNCHRONOUS VIDEO PROCESSING REQUESTS

(71) Applicant: Evolon Technology, LLC, Dallas, TX (US)

(72) Inventors: Shannon Scott, Los Alamos, NM (US); Jesse Plymale, Dallas, TX (US)

(73) Assignee: Evolon Technology, Inc., Dallas, TX (US)

( * ) Notice: Subject to any disclaimer, the term of this patent is extended or adjusted under 35 U.S.C. 154(b) by 0 days.

(21) Appl. No.: 17/131,309

(22) Filed: Dec. 22, 2020

(65) Prior Publication Data

US 2021/0195145 A1   Jun. 24, 2021

Related U.S. Application Data

(60) Provisional application No. 62/953,117, filed on Dec. 23, 2019.

(51) Int. Cl.

| | |
|---|---|
| *H04N 7/56* | (2006.01) |
| *G08B 13/196* | (2006.01) |
| *G06K 9/00* | (2006.01) |
| *G08B 29/18* | (2006.01) |
| *H04N 7/18* | (2006.01) |
| *G06T 7/11* | (2017.01) |
| *G06T 7/70* | (2017.01) |
| *H04N 5/232* | (2006.01) |
| *G06K 9/62* | (2006.01) |
| *G06T 3/40* | (2006.01) |

(Continued)

(52) U.S. Cl.
CPC ............ *H04N 7/56* (2013.01); *G06K 9/00671* (2013.01); *G06K 9/00718* (2013.01); *G06K 9/00771* (2013.01); *G06K 9/628* (2013.01); *G06T 3/40* (2013.01); *G06T 7/11* (2017.01); *G06T 7/70* (2017.01); *G06T 9/00* (2013.01); *G08B 13/19604* (2013.01); *G08B 13/19606* (2013.01); *G08B 13/19673* (2013.01); *G08B 13/19689* (2013.01); *G08B 29/185* (2013.01); *H04N 5/23212* (2013.01); *H04N 5/23296* (2013.01); *H04N 5/23299* (2018.08); *H04N 7/185* (2013.01); *G06T 2207/20132* (2013.01); *G08B 21/18* (2013.01)

(58) Field of Classification Search
CPC ................ H04N 7/56; G08B 13/19606; G08B 13/19673; G08B 13/19689
See application file for complete search history.

(56) References Cited

U.S. PATENT DOCUMENTS 7,145,700 B1 * 12/2006 Nishigaki .......... H04N 1/32598
358/468
9,191,299 B1 * 11/2015 Petit ........................ G16Z 99/00
(Continued)

*Primary Examiner* — Michael E Teitelbaum
(74) *Attorney, Agent, or Firm* — Nicholas Stadler

(57) ABSTRACT

The present application describes a video processing request system that receives video files and synchronous task requests, converts the synchronous task requests into asynchronous task requests, provides the video files to various processing units in response to the conversion, and subsequently provides processed video files back to requesting computing devices in response to the received synchronous task requests.

18 Claims, 6 Drawing Sheets

(51) Int. Cl.
*G06T 9/00* (2006.01)
*G08B 21/18* (2006.01)

(56) References Cited

U.S. PATENT DOCUMENTS

| | | | |
|---|---|---|---|
| 2013/0104177 A1* | 4/2013 | Kwan | H04N 21/234 |
| | | | 725/93 |
| 2014/0085501 A1* | 3/2014 | Tran | G06F 3/005 |
| | | | 348/222.1 |
| 2019/0222877 A1* | 7/2019 | Liao | H04N 21/658 |

* cited by examiner

VIDEO PROCESSING REQUEST SYSTEM FOR CONVERTING SYNCHRONOUS VIDEO PROCESSING TASK REQUESTS TO ASYNCHRONOUS VIDEO PROCESSING REQUESTS

CROSS-REFERENCE TO RELATED APPLICATION

The present application claims the benefit of U.S. Provisional Application No. 62/953,117, titled "System for Scalable Processing of Video files" filed on Dec. 23, 2019, the entire disclosure of which is hereby incorporated by reference in its entirety.

BACKGROUND

A video processing system typically receives video files for processing in order to detect objects of interest that are located within a particular field of view of a camera. In some cases, the video processing system receives large batches of video files from various client systems.

SUMMARY

A video processing request system typically receives a number of different video files from a number of different client devices. These video files are typically a series of images captured by one or more image capture devices. The image capture devices may include stationary image capture devices, moveable image capture devices (e.g., pan, tilt, zoom (PTZ) cameras) and the like. When the video files are received, the video processing request system causes the video files to be analyzed by a video processing unit in order to detect or otherwise identify an object of interest (e.g., a person, a vehicle, etc.) in a particular field of view associated with the image capture device. When an object of interest is detected, the video processing request system may provide a processed video file to an analysis system to enable the analysis system to determine whether the object of interest is a potential threat (e.g., a trespasser, unauthorized vehicle, etc.).

In some examples, the video files need to be processed in a short period of time in order to accurately and/or timely determine whether the object of interest is a threat or whether further action should be taken. However, the number of video files received by the video processing request system fluctuates. For example, in a first time period, the video processing system may receive a small batch of video files from one or more client devices. In another example, in a second time period, the video processing request system may receive a large batch of video files from one or more client devices. When large batches of video files are received, it may be difficult for the video processing system to process each video file in a short period of time.

As such, the present disclosure describes a video processing request system that receives a video processing task request, along with a video file to be processed, from a client device. When the video file and the processing task request have been received, the video file, the processing task request and/or information corresponding to the video file and processing task request, are temporarily stored in a queue. The video processing task request and the corresponding video file are then assigned to a video processing unit. To help enable the video processing request system to timely respond to the received video processing task requests, the video processing request system receives processing requests from various video processing units. The received processing requests indicate that a particular video processing unit is available to process received video files.

Accordingly, the present application describes a method that includes receiving a first synchronous task request from a first remote client device. The first synchronous task request may be associated with a first series of images to be processed. The method also includes receiving a second synchronous task request from a second remote client device. The second synchronous task request may be associated with a second series of images. In an example, the series of images may be in the form of a video file. A first asynchronous processing request, which may include a request to process a received series of images, is received from a first video processing unit. Likewise, a second asynchronous processing request, which may include a request to process a received series of images, is received from a second video processing unit. Prior to responding to the first synchronous task request or the second synchronous task request and in response to the first asynchronous processing request and the second asynchronous processing request, the first series of images is provided to the first video processing unit and the second series of images is provided to the second video processing unit. A first processed series of images is subsequently received from the first video processing unit and a second processed series of images is subsequently received from the second video processing unit. Based on receiving the first processed series of images, a first response to the first synchronous task request is provided. The first response includes the first processed series of images. Likewise, and based on receiving the second processed series of images, a second response is provided to the second synchronous task request. The second response includes the second processed series of images.

The present application also describes a system for processing received video files. In an example, the system includes a processor and a memory. The memory is communicatively coupled to the processor. The memory stores computer executable instructions that, when executed by the processor, perform operations. These operations include receiving a first synchronous task request from a first remote client device and receiving a second synchronous task request from a second remote client device. The first synchronous task request may be associated with a first series of images and the second synchronous task request may be associated with a second series of images. Prior to responding to the first synchronous task request or the second synchronous task request, the first series of images is provided to a first video processing unit based on a first received asynchronous processing request from a first video processing unit. A second series of images is provided to a second video processing unit based on a second received asynchronous processing request from the second video processing unit. Based on receiving a first processed series of images from the first video processing unit, a first response to the first synchronous task request is provided. The first response includes the first processed series of images. Based on receiving the second processed series of images from the second video processing unit a second response to the second synchronous task request is provided. The second response includes the second processed series of images.

The present application also describes a method that includes receiving a first processing request from a first video processing unit and receiving a second processing request from a second video processing unit. The first processing request and the second processing request may include a request to process a series of images. Based on determining that the incoming task queue contains a series of images and on expiration of a time period associated with the second processing request from the second video processing unit, the series of images is provided to the first video processing unit. The processed series of images is then stored in an outgoing task queue.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
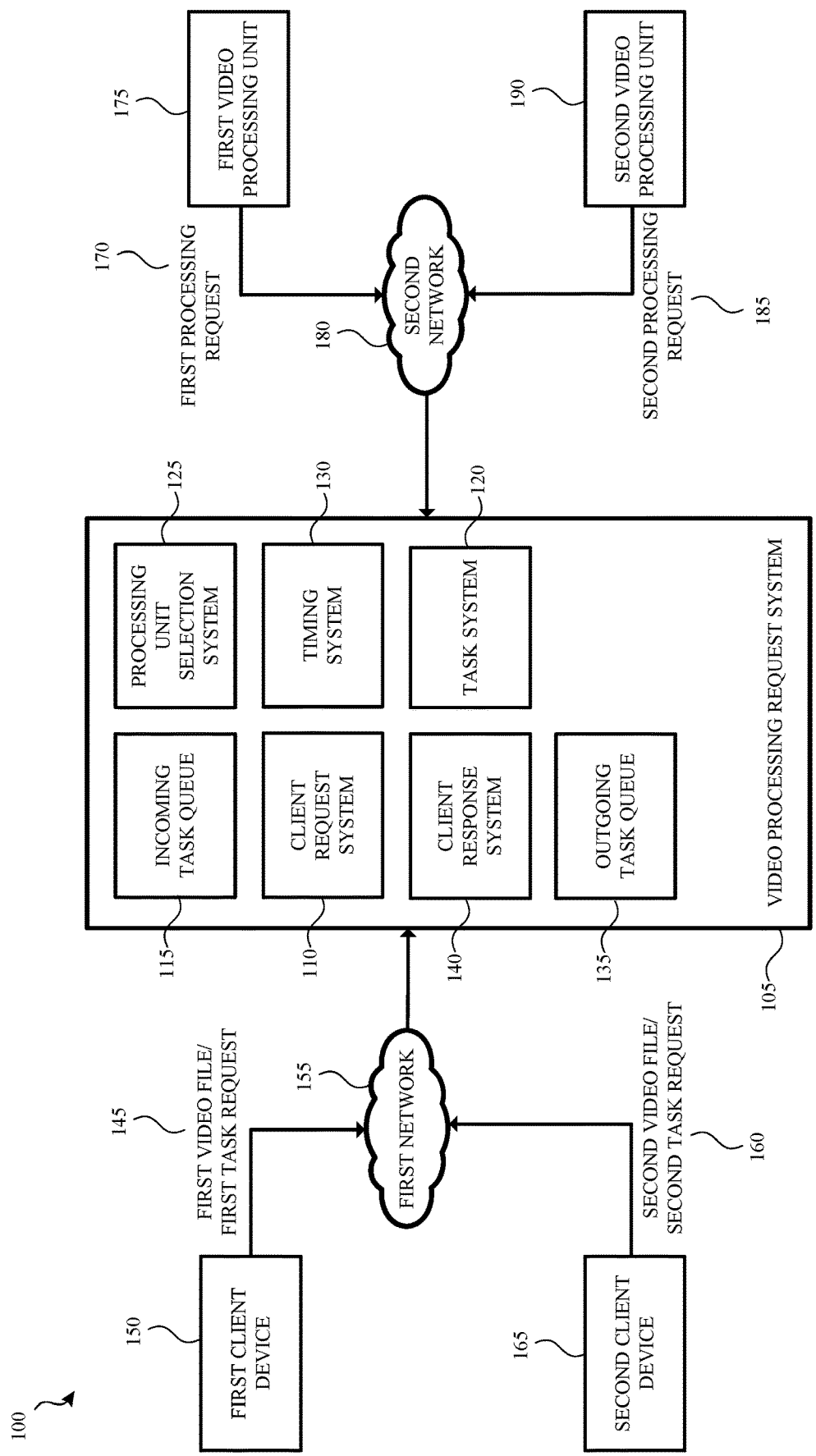
FIG. 1A illustrates an example system for mitigating the effects of sporadic changes in quantities of video file processing requests, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Surveillance systems and other video monitoring systems often generate video files that may be processed in order to ascribe meaning to the content of the video files. For example, a video file may have captured movement or detection of an object of interest that needs to be identified prior to determining whether additional actions need to be taken and/or in order to determine whether the object of interest is a threat. Once the video file is processed and the object of interest is detected or otherwise identified, if the object of interest is determined to be a threat, additional actions (e.g., causing a camera to zoom in on an object of interest, causing a camera to follow the object of interest as it moves through a field of view of the camera and/or the field of view of another camera, cause an alarm or alert to be triggered, etc.) may be taken.

In some examples, one or more client devices may capture various video files and provide the captured video files to a video processing request system for processing. The video processing request system processes the received video files in order to detect, identify and/or classify an object of interest in the captured video files. For example, when the video file is processed, an object of interest may be detected and/or classified by a video processing unit. The classification may cause the object of interest to be identified as a person, a vehicle, an animal, or other object. Once the object is detected and/or classified, the video processing request system returns the processed video files to the client device to enable the client device to determine whether an additional action, with respect to the identified object of interest, is to be taken. However, in order for the client device (or an operator of the client device) to take meaningful action based on the processed video files, the video files must be processed in a particular amount of time. In an example, the particular amount of time may be thirty seconds or less, twenty seconds or less, ten seconds or less and so on. Although a specific amount of time is mentioned, any amount of time may be used.

Given the sporadic nature of video surveillance in general, it is imperative that a video processing request system be ready and able to process received video files in the particular amount of time (e.g., ten seconds or less) regardless of the number of video files that are received. For example, at times, a video processing request system may receive few video files from various client devices in response to the client devices detecting one or more trigger events. At other times, various client devices may detect a cluster of trigger events during which a large number of video files are sent to the video processing request system.

In current solutions, receipt of a high volume of video files in a short period of time may cause potential problems in that the video processing request system needs to have a large number of video processing units available to process the video files in a required processing time. However, if the large number of video processing units are always available to handle high volumes, these video processing units would be running inefficiently and not at peak capacity during low volume times. Conversely, if a few video processing units were always available to handle a low volume of video files, the time to turn on or locate additional video processing units at a high volume time may further increase the total processing time. Additionally, keeping track of which and how many video processing units are available at any given time may also cause the video processing request system to use a large amount of processing power, thereby increasing a turn-around time for processing a video file.

Accordingly, the present application describes a video processing request system that converts a synchronous process of receiving requests from client systems (i.e., surveillance systems) into an asynchronous process. For example, when the video processing request system receives a video file from a client device, the first video file need not be fully processed before a second video file is accepted for processing; instead, a second video file can be received and assigned to a different video processing unit while the first video file is still being processed. In addition, depending on the properties of the first and second video files (i.e. file size, type of processing required, etc.), the video file that is finished processing first may be returned to its associated client first, regardless of whether it was the first or second video file received by the video processing request system. When a video file is received from a client system device, the video processing request system may save the video file in a queue before determining which video processing unit to send it to. In this way, the desired processing times may be achieved.

The video processing request system may also be configured to receive processing requests from video processing units that are available to process video files, instead of keeping track of which and how many video processing units are available at a given time. If a video file is available to be processed, the video processing request system sends the video file to an available video processing unit. If there are no video files available to be processed, a communication session or other such request between the video processing unit and the video processing request system may be terminated. When the communication session has been terminated, the video processing request system may receive a subsequent processing request from the video processing unit. In this way, the video processing request system may scale its operation to meet large or small volumes of video files to be processed, while saving processing power by not having to monitor the status of one or more video processing units.

These and other examples will be explained in more detail below with respect to FIG. 1A-FIG. 3.

FIG. 1A illustrates an example system 100 for processing video files. As will be described in more detail below, the system 100 includes a video processing request system 105 that receives various video files (e.g., first video file 145 and second video file 160) and associated task requests (e.g., synchronous task requests requesting the video processing request system 105 process the video file associated with the synchronous task request) from various client devices (e.g., first client device 150 and second client device 165). The video processing request system 105 queues the video files for processing, allocates the video files to various video processing units, and provides processed video files back to the respective client devices.

In an example, the video files may be a series of images captured by various image capture devices and/or image sensors. The series of images may be still images, live images, or a combination thereof. The various image capture devices may be stationary image capture devices, moveable image capture devices (e.g., PTZ cameras) and the like. In other examples, the video files may be generated by input from various sensors such as, for example, infrared or temperature sensors.

As shown in FIG. 1A, the video processing request system 105 receives video files and corresponding task requests from various client device. For example, the video processing request system 105 may receive, over a first network 155 or other communication channel, a first video file/first task request 145 from a first client device 150. Likewise, the video processing request system 105 may receive, over the first network 155 a second video file/second task request 160 from a second client device 165. In an example, the first client device 150 and/or the second client device 165 may be associated with or otherwise part of a video surveillance system, a security system, a traffic system, a monitoring system, and the like. In another example, the first client device 150 and/or the second client device 165 may be individual cameras and/or computing devices.

The video processing request system 105 may receive the first video file 145 from the first client device 150 in response to an object of interest (e.g., a person, a vehicle, etc.) entering a particular field of view of an image capture device associated with the first client device 150. In particular, when an object of interest enters the field of view of an image capture device associated with the first client device 150 and a video file of the object of interest is captured, the first client device 150 may determine that the video file needs further processing in order to determine whether the object of interest is a potential threat (e.g., a trespasser, unauthorized vehicle, etc.) or whether the object of interest can be ignored. As such, the first client device 150 provides the first video file/first task request 145 to the video processing request system 105 for processing.

Likewise, the second client device 165 may receive a different video file from one or more associated image capture devices and determine that this video file needs further processing in order to determine whether an object of interest in a particular field of view of one its image capture devices is a potential threat or whether the object of interest can be ignored. Accordingly, the second client device 165 provides the second video file/second task request 160 to the video processing request system 105 for processing.

In some examples, the first video file/first task request 145 and the second video file/second task request 160 may be received by the video processing request system 105 at the same time, at substantially the same time or at different times. Additionally or alternatively, the video processing request system 105 may receive multiple video files from the first client device 150 during a particular time period and not receive any video files from the second client device 165 during that same time period. In another example, the video processing request system 105 may receive multiple video files from both the first client device 150 and the second client device 165 during a particular time period. In yet another example, the video processing request system 105 may receive a small number of video files from the first client device 150 and the same amount (or a smaller amount) of video files form the second client device 165 during a particular time period.

Regardless of the number of video files that are received by the video processing request system 105 in a particular time period, the video files may need to be processed in a short period of time in order to accurately and/or timely determine whether the object of interest is a threat or whether further action needs to be taken. In some examples, this timeframe may be one minute or less, thirty seconds or less, ten seconds or less, etc. In some examples, the video files need to be processed quickly so that the information from a camera with a fixed field of view can be used to determine whether another camera with a different fixed or movable field of view should be turned on or directed to the area of an identified object of interest. In other examples, quick processing is required so that a person (i.e. security guard) may be sent to investigate an object of interest, a gate or door may be locked or opened, or an alarm may sound in response to the object of interest.

In the examples described herein, task requests associated with received video files are "synchronous task requests." As used herein, a synchronous task request is a request in which the video processing request system 105 receives a request from a client device but, prior to providing a response to the request, the video processing request system 105 keeps the communication channel with the client device open and performs one or more actions relating to the request. Once the one or more actions are complete, a response to the synchronous task request is provided. For example, in standard request response models, a system may receive a request from a client device, respond that the request is received, perform one or more actions, reestablish a communication session with the client device indicating the action are complete, and subsequently provide a response back to the client device. In situations in which the actions are time sensitive (such as those described herein), the additional time required for this back and forth communication is costly.

In contrast and as explained above, when a task request is received by the video processing request system 105, the video processing request system 105 begins performing various actions to address the request and responds to the request with an accomplished task. In the examples described herein, the accomplished task is a processed video file such as will be described below. For example, the video processing request system 105 "converts" the synchronous task request to an "asynchronous task request."

As used herein, an asynchronous processing request is a request in which a communication channel between the video processing request system 105 and a video processing unit (or other computing device) is not necessarily maintained. For example, a video processing unit (e.g., first video processing unit 175) may submit a task processing request (e.g., first processing request 170) to the video processing request system 105 indicating that the video processing unit is available to perform one or more actions (e.g., processing a received video file) on behalf of the video processing request system 105. Regarding an asynchronous processing request, for example, a first video file 145 need not be fully processed before a second video file 160 is accepted for processing; instead, a second video file 160 can be received and assigned to a second video processing unit 190 while the first video file 165 is still being processed by a first video processing unit 175. When one of either the first video processing unit 175 or the second video processing unit 190 has completed processing its video file, it may become available to send another task processing request, and the video processing request system 105 may assign to it another video file to be processed, before the other video processing unit has finished its first processing task.

If the video processing request system 105 has a task for the video processing unit to perform, the video processing request system 105 provides the task information and/or the associated video file to the video processing unit. If not, the initial request may time out or otherwise expire and the video processing unit may submit a subsequent processing request indicating its availability to perform various tasks. Since the video processing request system 105 receives these processing requests from the video processing units, the video processing request system 105 does not need to consistently or constantly perform various queries to determine which video processing units are available and which ones aren't thereby reducing unnecessary delays in requesting that various processing units process received video files.

In order to accomplish the above, the video processing request system 105 may include a client request system 110 and an incoming task queue 115. The client request system 110 handles incoming tasks from the various client devices. For example, when the video processing request system 105 receives the first video file/first task request 145 from the first client device 150, the first task request is received or is otherwise acknowledged by the client request system 110. Although the first task request is received or otherwise acknowledged by the client request system 110, a response or other such acknowledgement to the first task request may not necessarily be provided to the first client device 150. Additionally, the incoming task queue 115 stores (either permanently, semi-permanently, or temporarily) the first video file associated with the first task request. Although the incoming task queue 115 and the client request system 110 are shown as separate systems, a single system may provide the functionality described above.

The incoming task queue 115 may have a first-in, first-out configuration, a last-in, first-out configuration or other such configuration. In another example, an order of video files (and associated task requests) may be arranged based, at least in part, on various factors associated with the received video file and/or its associated task request. For example, video files having smaller or larger file sizes may be ordered in a particular arrangement. In another example, video files and/or task requests from one business entity may be prioritized over video files and/or task requests received from other business entities (e.g., based on a level of services, a subscription, a relationship, a number of received requests over a particular time period, etc.).

Likewise, the incoming task queue 115 and the client request system 110 may perform similar operations when a second video file/second task request 160 is received from the second client device 165.

The video processing request system 105 may also receive, via a second network 180 or other communication channel, various processing requests from various video processing units. For example, the video processing request system 105 may receive a first processing request 170 from a first video processing unit 175 and a second processing request 185 from a second video processing unit 190. Although the first network 155 and the second network 180 are shown as different networks, this is shown as an example and the various communications described herein may occur over the same network or a number of different networks.

The first processing request 170 and the second processing request 185 may be received at the same time, at substantially the same time or at different times. The video processing request system 105 may receive multiple different processing requests from one video processing unit (e.g., due to an initial processing request timing out or otherwise expiring) prior to receiving one or more processing requests from a different video processing unit. In some examples, the first processing request 170 or second processing request 185 may include a request for a task to process a video file, a request for instructions on how a video file is to be processed (i.e. if there are specific objects of interests to detect, if the images should be marked in some way, etc.), a request for information regarding a processing time constraint, a request for file size and type information, and other requests. In some examples, the first video processing unit 175 or second video processing unit 190 may be an artificial intelligence system or another system capable of processing a video file in order to detect and/or classify an object of interest. In some embodiments the first video processing unit 175 or the second video processing unit 190 may be remote from the video processing request system 105, or it may be local to the video processing request system 105.

Once the video processing request system 105 receives the first processing request 170 and/or the second processing request 185, a task system 120 acknowledges the processing requests and communicates with the incoming task queue 115 as to whether there are any video files stored in the incoming task queue 115 that need to be processed. If so, a processing unit selection system 125 selects an available video processing unit and causes a video file in the incoming task queue 115 to be provided to the video processing unit.

For example and referring to FIG. 1B, when the video processing request system 105 determines, using for example, information provided via the task system 120, a timing system 130 (described in more detail below), the processing unit selection system 125, the incoming task queue 115 and/or the client request system 110, that a synchronous task request has been received and a video processing unit (e.g., the first video processing unit 175 and/or the second video processing unit 190) is available to process received video files, the processing unit selection system 125 selects a particular processing unit to process the received video file.

In some examples, the determination of which of the video files may be allocated to which processing request may be based on factors such as a first processing time constraint associated with the first video file 145, a second processing time constraint associated with a second video file 160, the type of processing required, the file type or size of the first video file 145 or second video file 160, the processing capabilities of the first video processing unit 175 and the second video processing unit 190, other factors, or a combination of factors. Once a satisfactory determination has been made by the processing unit selection system 125, the task system 120 retrieves the chosen first video file 145 or second video file 160, and communicates it to the chosen first video processing unit 175 or second video processing unit 190 through a second network 180.

Figure 1B:
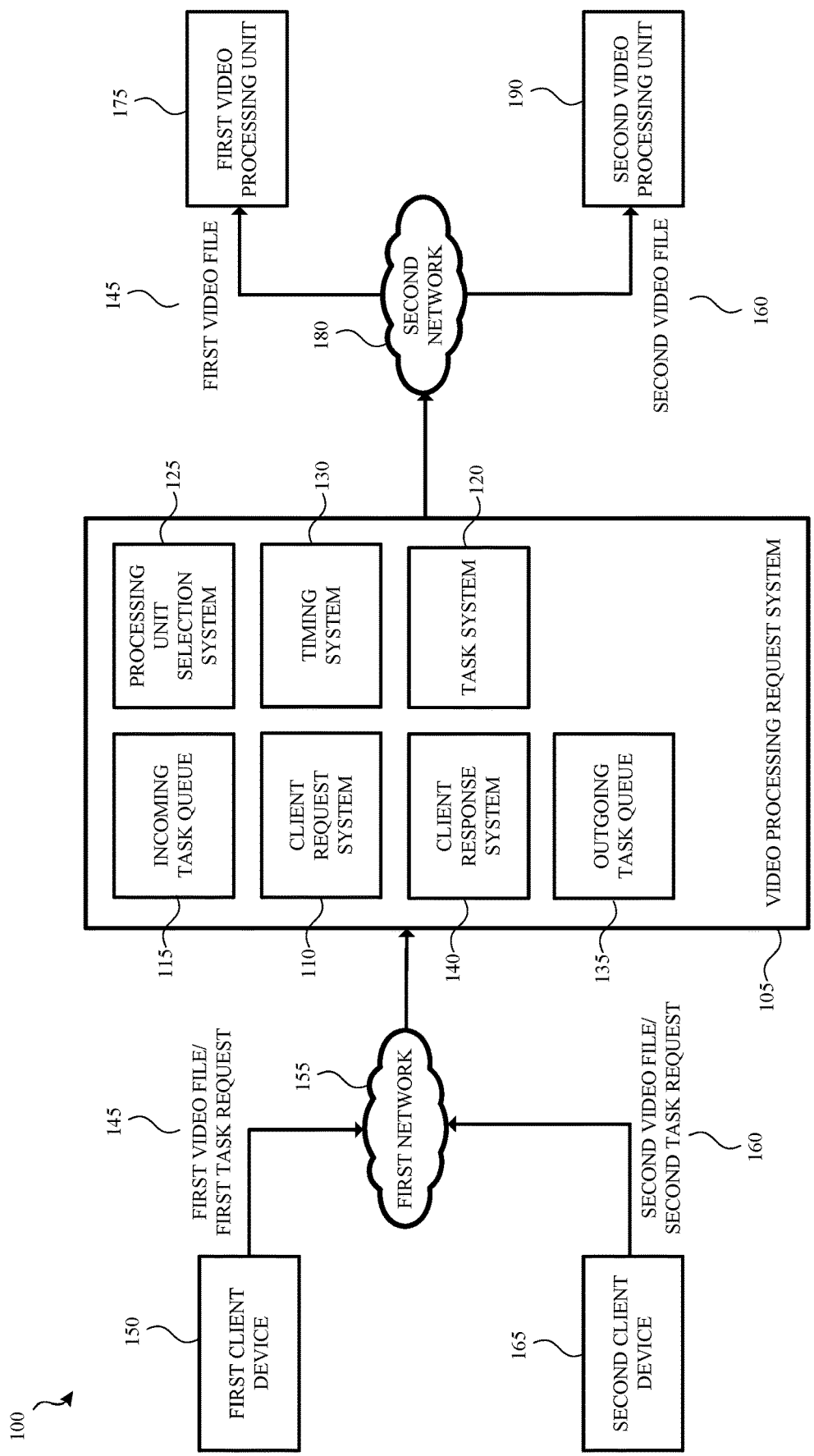
FIG. 1B illustrates the example system of FIG. 1A in which the video files are sent to the video processing units for processing, according to an example.
Figure 1C:
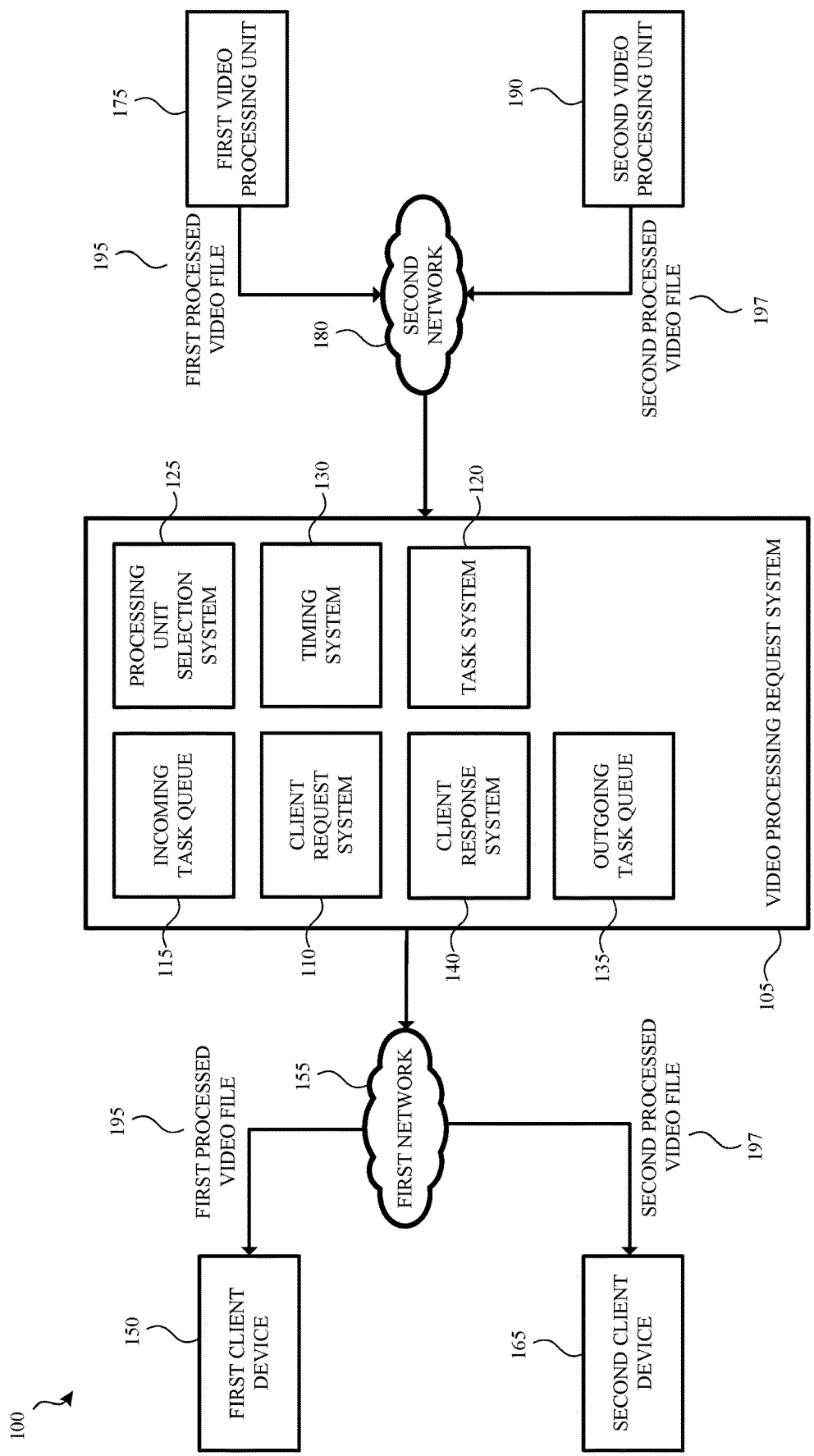
FIG. 1C illustrates the example system of FIG. 1A in which processed video files are received from the video processing units and sent to the remote client devices, according to an example.

In the example shown in FIG. 1B, the video processing request system 105 provides the first video file 145 to the first video processing unit 175 and provides the second video file 160 to the second video processing unit 190. In some examples, the first video file 145 and the second video file 160 may be provided to the respective video processing units simultaneously, substantially simultaneously, or sequentially. In other examples and depending on received processing requests, the timing of the processing requests, and whether the incoming task queue 115 contains video files to be processed, the first video processing unit 175 may receive both the first video file 145 and the second video file 160.

In an example, once the task system 120 of the video processing request system 105 has received at least a first processing request 170 from a first video processing unit 175 and/or a second processing request 185 from a second video processing unit 190, if task system 120 determines that there is no first video file 145 or second video file 160 in the incoming task queue 115, the timing system 130 may determine whether a time period associated with the first processing request 170 has expired.

If the time period associated with the first processing request 170 has expired, the task system 120 may terminate the first processing request 170 from the first video processing unit 175. If the time period associated with the first processing request 170 has not expired, the task system 120 may retain the first processing request 170 from the first video processing unit 175 at least until the associated time period expires.

If a second processing request 185 has also been received by the task system 120, the timing system 130 may determine whether a time period associated with the second processing request 185 has expired. If the time period associated with the second processing request 185 has expired, the task system 120 may terminate the second processing request 185 from the second video processing unit 190. If the time period associated with the second processing request 185 has not expired, the task system 120 may retain the second processing request 185 from the second video processing unit 190 at least until the associated time period expires.

In an example, a video processing unit may detect an object of interest (i.e. a person, a vehicle, an animal, etc.). In some examples, a video processing unit may mark one or more of the images in a video file to outline, point out, label, identify, or otherwise indicate a detected object of interest. In some examples, detection of an object of interest may be indicated in associated data or metadata. In an example, a video processing unit may detect motion of an object of interest. In some examples, a video processing unit may indicate whether a detected object of interest is in motion, the direction of the motion, the speed of the motion, prediction of the future path of the object of interest, or other information regarding the motion; this indication may be on one or more images of the video file or may be included in associated data or metadata.

In some examples, indication of the motion may include placing a path of dots or other shapes on one or more images of the video file. In some examples, a video processing unit may determine a confidence score associated with a detection of an identified object of interest or a detection of motion. In some examples, the confidence score may be indicated on one or more images of the video file or may be included in associated data or metadata. In some examples, the confidence score may reflect a probability that the detected object of interest is a new object, may reflect a probability that the detected object of interest is a specific type of object (i.e. a person but not a dog and not a vehicle in an example, etc.), or may indicate that a velocity threshold is breached.

In an example, a video processing unit may compare a confidence score with a pre-determined threshold, and may indicate if the confidence score is above or below that threshold, in order to assist the remote client device that requested processing of the video file with determining an action (or lack of action) based on the confidence score. In an example, this indication would be helpful for a surveillance or security system to know whether a detected object is something requiring action or alarm (i.e. a person in a secure area who should be followed by a security guard or monitored by additional cameras) or a nuisance to be ignored (i.e. an insect flying in the field of view of a camera).

Once the first video file 145 and/or the second video file 160 have been processed (e.g., to identify an object of interest in the video file such as described above), the processed video files are received by the video processing request system 105. For example and referring to FIG. 1C, the video processing request system 105 may receive, via the second network 180, a first processed video file 195 from the first video processing unit 175 and may receive a second processed video file 197 from the second video processing unit 190. In an example, the processed video files may include a series of images. In another example, the processed video files may include a series of images and associated data or other metadata. In another example, the processed video file may include only data or metadata.

Once the respective processed video files and their associated data, in some examples, are received, the task system 120 may cause the processed video files to be provided to and/or stored in an outgoing task queue 135. A client response system 140, in communication with the outgoing task queue 135 and/or the task system 120 may determine that a corresponding received task request (e.g., the first task request that is associated with the now first processed video file 195) may be responded to. As such, the first processed video file 195 is provided to the first client device 150 via the first network 155. Likewise, the second processed video file 197 may be provided to the second client device 165 in a similar manner.

In an example, the first video file 145 is associated with a first processing time constraint or threshold within which the first video file 145 is to be processed and returned to the first remote client device 150. In example, the second video file 160 is associated with a second processing time constraint or threshold within which the second video file 160 is to be processed and returned to the second remote client device 165. In some examples, the amount of time of the first or second time constraints may change based, at least in part, on a time of day the video file was received by the video processing system, an identity/entity associated with the client device that provided the video file, a number of video files received from the client device within a particular time period, and so on.

In an example, the first processing time constraint and second processing time constraint may be recorded by the timing system 130 of the video processing request system 105. In some examples, the timing system 130 may also record data such as the timestamp that the first video file 145 and the second video file 160 were received by the client request system 110. The timing system 130 may be used to track an amount of time between when a video file and an associated task request is received and subsequently responded to, may be configured to determine whether an incoming processing request has timed out or expired (or causes the processing request to time out or expire), and/or may be configured to track an amount of time between when a video file is stored in the incoming task queue, provided to a video processing unit, received back from the video processing unit, stored in an outgoing task queue (e.g., outgoing task queue 135) and/or subsequently provided to requesting client device.

Figure 2:
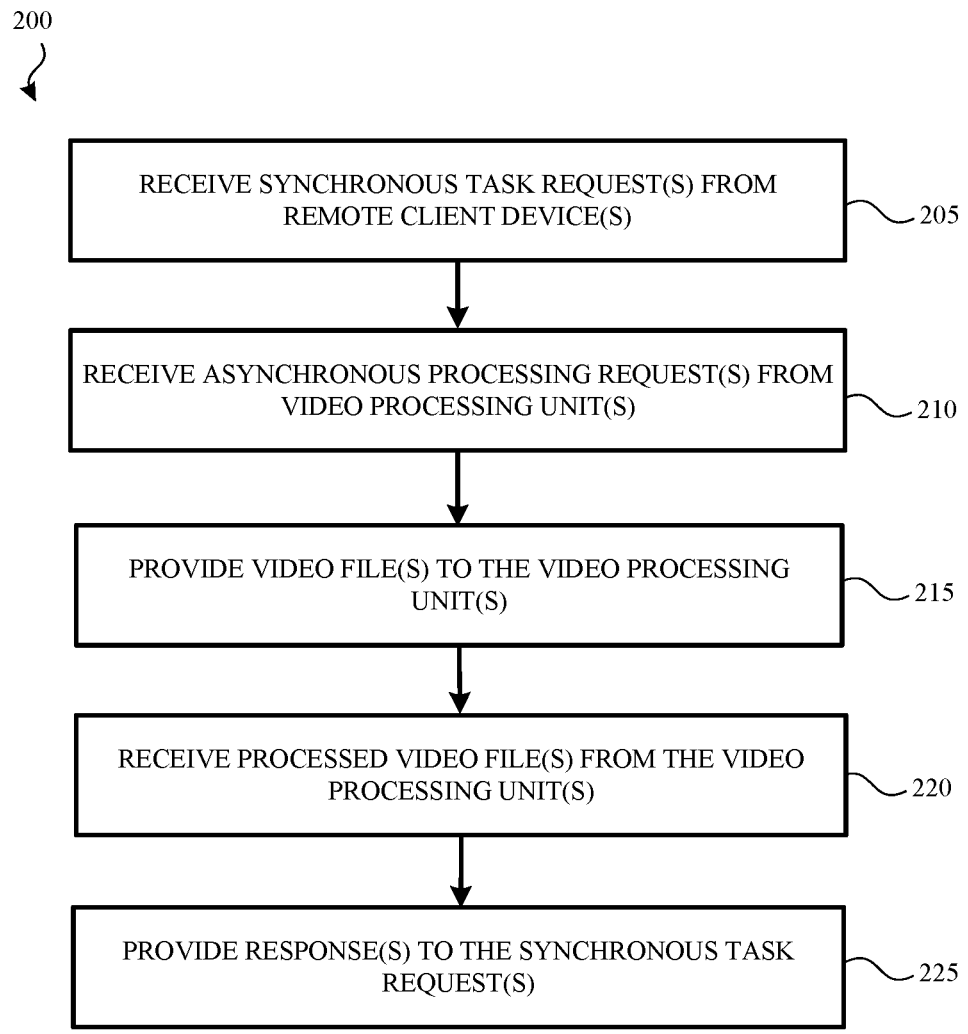
FIG. 2 illustrates a method for mitigating the effects of sporadic changes in quantities of video file processing requests, according to an example.

FIG. 2 illustrates a method 200 for converting synchronous video task requests to asynchronous video processing requests. The method 200 may be performed by one or more systems of the system 100 shown and described with respect to FIG. 1A, FIG. 1B, and FIG. 1C.

Method 200 begins when a video processing request system receives (205) one or more synchronous task requests from one or more remote client devices. These synchronous task requests may be task requests to process one or more video files. In some examples, a client device may be a surveillance system, one or more cameras, or one or more other imaging or sensing devices. In some examples, the synchronous task requests may include the video file to be processed, information on the type of processing required, a threshold amount of time within which the video file needs to be processed, or other data or metadata.

A video processing request system may also receive (210) one or more asynchronous processing requests from one or more video processing units. In an example, a video processing unit may be an artificial intelligence unit or other computing device/system capable of processing video files in order to detect and/or classify an object of interest. In an example, an asynchronous processing request is a request to process a video file.

In response to the receipt of one or more asynchronous processing requests, a video processing request system provides (215) a video file associated with a synchronous task request to a video processing unit associated with one of the asynchronous processing requests. The allocation of a video file to a particular video processing unit may be based on a threshold time in which the video file is to be processed, the type of processing required for the video file, the availability of the video processing unit to process the video file, the processing speed, capacity, or capability of the video processing unit, or the time that has elapsed since the video file was received by the video processing request system.

Once the video processing unit has processed the video file, the video processing request system receives (220) a processed video file from the video processing unit. In an example, the processed video file may include a series of images. In another example, the processed video file may include other data or metadata, for example annotations or markings to show the identification of an object of interest, additional files containing data regarding objects of interest, object velocity, object travel path, or a confidence score regarding the identification of the object of interest. In another example, the processed video file may include a series of images and other data.

In response to receiving the processed video file, provides (225) a response to the synchronous task request from the remote client device associated with the processed video file.

Figure 3:
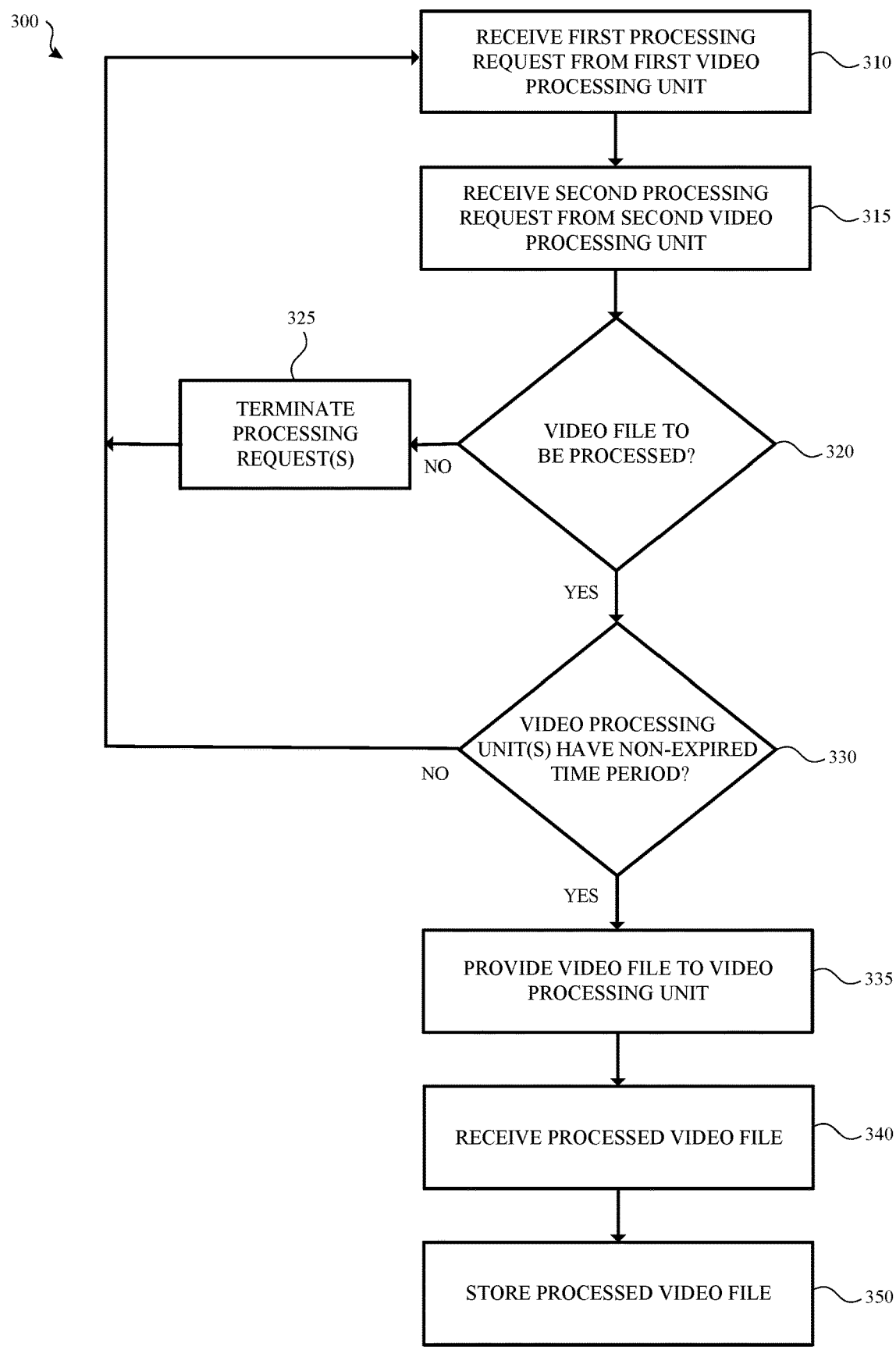
FIG. 3 illustrates a method for determining whether to assign a video file to a video processing unit for processing, according to an example.

FIG. 3 Illustrates a method 300 for determining whether to assign a video file to a video processing unit for processing. The method 300 may be performed by one or more systems of the system 100 shown and described with respect to FIG. 1A, FIG. 1B, and FIG. 1C.

Method 300 begins when a video processing request system receives (310) a first processing request from a first video processing unit. A video processing request system may also receive (315) a second processing request from a second video processing unit. In an example, the first and second video processing units may be artificial intelligence units or other systems capable of processing video files. In an example, the first processing request and the second processing request are an asynchronous requests such as described above.

In response to receiving the first processing request and/or the second processing request, the video processing request system determines (320) whether there is a video file available to be processed. In an example, a video file available to be processed may be stored in an incoming task queue. In some examples, the video file to be processed includes a video file and information on the type of processing required, a threshold amount of time within which the video file needs to be processed, or other associated data. If there is no video file available to be processed, then the video processing request system may terminate (325) the first and/or second processing requests, and flow returns to operation 310. This portion of the method 300 may be repeated until it is determined that a video file needs to be processed.

In an example, the first and/or second processing units each have an associated time period in which they will be available to process a video file after sending their respective processing requests. If there is a video file available to be processed, the video processing request system may determine whether the first and/or second video processing units are still available to process the video file, based on whether (330) the first and/or second video processing units have a non-expired time period. If a video processing unit has an expired time period, it is no longer available to receive a video file to be processed, and the video processing request system will provide the video file to a processing unit with a valid/non-expired time period and/or wait for video processing unit to send another processing request. If there is a video processing unit that has a non-expired time period, the video processing request system provides (335) an available video file to the available video processing unit for processing 335.

In an example, the video processing unit may detect an object of interest (i.e. a person, a vehicle, an animal, etc.) captured in the video file. In some examples, the video processing unit may mark one or more of the images in a video file to outline, point out, label, identify, or otherwise indicate a detected object of interest. In some examples, a video processing unit may indicate whether a detected object of interest is in motion, the direction of the motion, the speed of the motion, prediction of the future path of the object of interest, or other information regarding the motion. In some examples, indication of the motion may include placing a path of dots or other shapes on one or more images of the video file. In some examples, a video processing unit may determine a confidence score associated with a detection of an identified object of interest or a detection of motion. In some examples, the confidence score may be indicated on one or more images of the video file or may be included in associated data or metadata. In an example, a video processing unit may compare a confidence score with a predetermined threshold, and may indicate if the confidence score is above or below that threshold, in order to assist the remote client device that requested processing of the video file with determining an action (or lack of action) based on the confidence score.

Once the video file has been processed, the video processing request system receives (340) the processed video file from the video processing unit. In an example, the processed video file may include other data, for example, annotations or markings to show the identification of an object of interest, additional files containing data on objects of interest, object velocity, object travel path, or a confidence score regarding the identification of the object of interest. The video processing request system may then store (350) the processed video file. In an example, the video processing request system may store the processed video file and its associated data in an outgoing task queue and subsequently be provided to the computing device that originally submitted the video file for processing. In an example, the video processing unit, after sending the processed video file to the video processing request system, may send another processing request to the video processing request system, thus starting the method over (310). The video processing unit may do this regardless of the completion status of other video processing units that have assigned tasks from the video processing request system.

Figure 4:
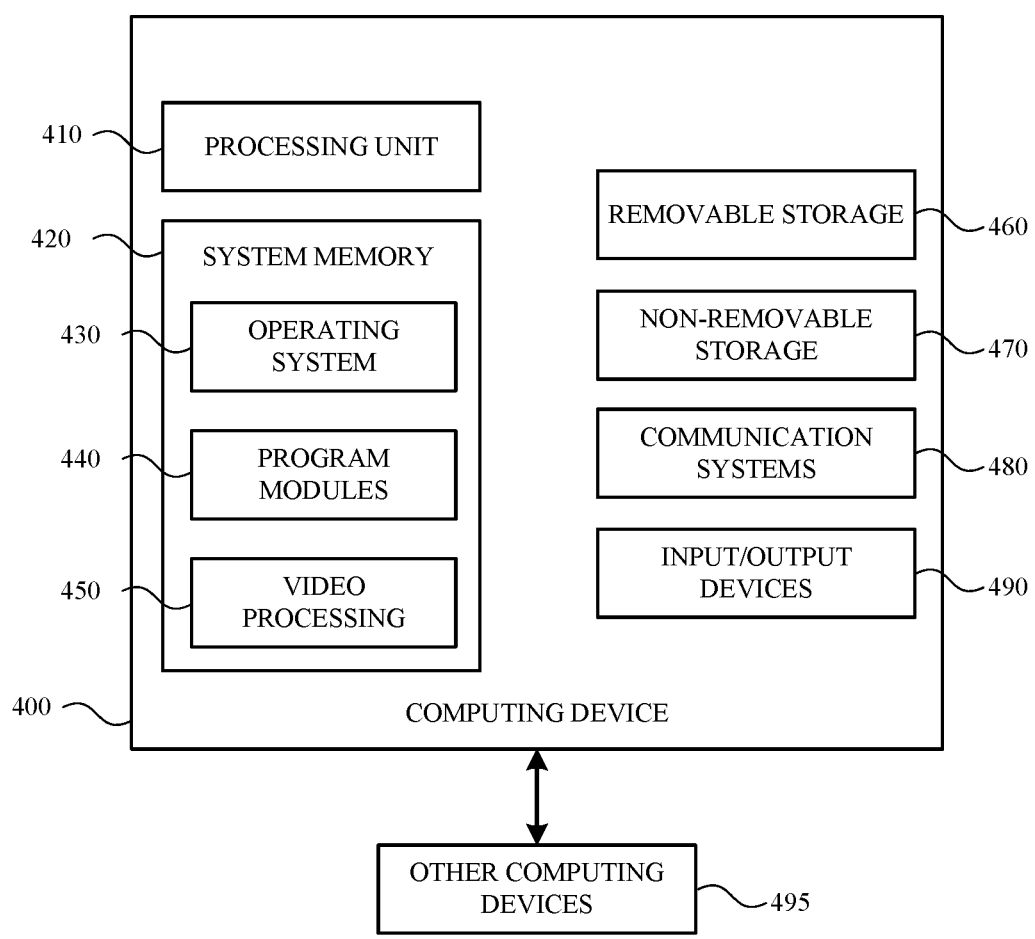
FIG. 4 is a block diagram of a computing device according to one or more examples.

FIG. 4 is a system diagram of a computing device 400 according to an example. The computing device 400, or various components and systems of the computing device 400, may be integrated or associated with an image capture device, a client device (e.g., first client device 150 and/or second client device 165 (FIG. 1A)), the video processing request system 105 (FIG. 1A), and/or a video processing unit (e.g., the first video processing unit 175 and/or the second video processing unit 190 (FIG. 1A)). As shown in FIG. 4, the physical components (e.g., hardware) of the computing device are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for tracking incoming and outgoing tasks, video files, requests, timing aspects and the like (collectively referred to as video processing 450). A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470. These storage devices may be capable of storing video files, video clips, series of images, single images, text files, and other types data or metadata types.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel ports, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an example or embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
   receiving a first synchronous request from a first remote client device, the first synchronous request being associated with a first series of images;
   receiving a second synchronous request from a second remote client device, the second synchronous request being associated with a second series of images;
   receiving a number of asynchronous task requests, including a first asynchronous task request which includes a request to process a first series of images and a second asynchronous task request which includes a request to process a second series of images, from a number of video processing units, including a first video processing unit and a second video processing unit, without keeping track of which or how many video processing units are available;
   prior to responding to the first synchronous request or the second synchronous request and in response to the first asynchronous request and the second asynchronous request:
      providing the first series of images to the first video processing unit;
      providing the second series of images to the second video processing unit;
      receiving a first processed series of images from the first video processing unit; and
      receiving a second processed series of images from the second video processing unit;
   based on receiving the first processed series of images, providing a first response to the first synchronous request, the first response including the first processed series of images; and
   based on receiving the second processed series of images, providing a second response to the second synchronous request, the second response including the second processed series of images.

2. The method of claim 1, wherein at least one of the first series of images or the second series of images is associated with a time constraint.

3. The method of claim 2, wherein the time constraint specifies a threshold amount of time in which at least one of the first series of images or the second series of images is to be processed by the first video processing unit.

4. The method of claim 1, wherein at least one of the first remote client device or the second remote client device comprises a security system.

5. The method of claim 1, wherein at least one of the first processed series of images or the second processed series of images comprises metadata associated with an identified object of interest.

6. The method of claim 1, wherein at least one of the first processed series of images or the second processed series of images comprises a confidence score associated with an identified object of interest.

7. The method of claim 1, wherein receiving at least one of the first synchronous request from the first remote client device or the second synchronous request from the second remote client device further comprises storing at least one of the first synchronous request or the second synchronous request in an incoming task queue.

8. The method of claim 1, wherein receiving at least one of the first processed series of images from the first video processing unit or the second processed series of images from the second video processing unit further comprises storing at least one of the first processed series of images or the second processed series of images in an outgoing task queue.

9. The method of claim 1, further comprising:
   receiving a third asynchronous task request from a third video processing unit, the third asynchronous task request including a request to process received series of images; and
   based on an expiration of a time period, terminating the third asynchronous task request received from the third video processing unit.

10. A system, comprising:
   a processing unit; and
   a memory communicatively coupled to the processing unit, the memory storing computer executable instructions that, when executed by the processing unit, perform operations, comprising:
      receive a first synchronous video processing request from a first remote client device, the first synchronous video processing request being associated with a first series of images;
      receive a second synchronous video processing request from a second remote client device, the second synchronous video processing request being associated with a second series of images;
      receive a number of asynchronous task requests, including a fist received asynchronous task request and a second received asynchronous task request, from a number of video processing units without keeping track of which or how many video processing units are available;

prior to responding to the first synchronous video processing request or the second synchronous video processing request:
provide the first series of images to a first video processing unit based on the first received asynchronous task request from the first video processing unit; and
provide the second series of images to a second video processing unit based on the second received asynchronous task request from the second video processing unit;

based on receiving a first processed series of images from the first video processing unit, provide a first response to the first synchronous request, the first response including the first processed series of images; and based on receiving the second processed series of images from the second video processing unit, provide a second response to the second synchronous request, the second response including the second processed series of images.

11. The system of claim 10, wherein at least one of the first series of images or the second series of images is associated with a time constraint.

12. The system of claim 11, wherein the time constraint specifies a threshold amount of time in which at least one of the first series of images or the second series of images is to be processed by the first video processing unit.

13. The system of claim 10, wherein at least one of the first remote client device or the second remote client device comprises a security system.

14. The system of claim 10, wherein at least one of the first processed series of images or the second processed series of images comprises metadata associated with an identified object of interest.

15. The system of claim 10, wherein at least one of the first processed series of images or the second processed series of images comprises a confidence score associated with an identified object of interest.

16. The system of claim 10, further comprising instructions for
storing at least one of the first synchronous video processing request or the second synchronous video processing request in an incoming task queue.

17. The system of claim 10, further comprising instructions for:
storing at least one of the first processed series of images or the second processed series of images in an outgoing task queue.

18. The system of claim 10, further comprising instructions for:
receiving a third received asynchronous task request from a third video processing unit, the third asynchronous task request including a request to process received series of images;
and
based on an expiration of a time period, terminating the third received asynchronous task request received from the third video processing unit.

* * * * *